US011386205B2

(12) United States Patent
Lancioni et al.

(10) Patent No.: US 11,386,205 B2
(45) Date of Patent: Jul. 12, 2022

(54) DETECTION OF MALICIOUS POLYGLOT FILES

(71) Applicant: McAfee, LLC, San Jose, CA (US)

(72) Inventors: German Lancioni, San Jose, CA (US); Carl D. Woodward, Santa Clara, CA (US)

(73) Assignee: McAfee, LLC, San Jose, CA (US)

(*) Notice: Subject to any disclaimer, the term of this patent is extended or adjusted under 35 U.S.C. 154(b) by 517 days.

(21) Appl. No.: 16/246,751

(22) Filed: Jan. 14, 2019

(65) Prior Publication Data

US 2020/0226253 A1 Jul. 16, 2020

(51) Int. Cl.
*G06F 21/00* (2013.01)
*G06F 21/56* (2013.01)
*G06F 16/11* (2019.01)

(52) U.S. Cl.
CPC ............ *G06F 21/56* (2013.01); *G06F 16/122* (2019.01); *G06F 2221/034* (2013.01)

(58) Field of Classification Search
CPC ........ G06F 21/50; G06F 21/56; G06F 16/122; G06F 2221/034; H04L 63/14
USPC .......................................................... 726/23
See application file for complete search history.

(56) References Cited

U.S. PATENT DOCUMENTS

| 8,756,695 | B1* | 6/2014 | Golomb ................ G06F 21/563 370/328 |
| 8,863,288 | B1 | 10/2014 | Savage et al. |
| 9,195,829 | B1* | 11/2015 | Goradia .................. G06F 21/53 |
| 9,330,264 | B1* | 5/2016 | Hutton ................ H04L 63/1416 |
| 9,372,881 | B1* | 6/2016 | Upton ................... G06F 16/258 |
| 9,838,418 | B1 | 12/2017 | Wardle |
| 11,003,774 | B2* | 5/2021 | Saxe ......................... G06N 3/04 |
| 2005/0034121 | A1* | 2/2005 | Fisher ....................... G06F 8/61 717/175 |
| 2013/0259292 | A1* | 10/2013 | Massimino ........... G06T 1/0035 382/100 |
| 2015/0106157 | A1* | 4/2015 | Chang ................ G06Q 30/0201 705/7.29 |
| 2015/0281260 | A1 | 10/2015 | Arcamone et al. |
| 2016/0246800 | A1 | 8/2016 | Soeder et al. |
| 2017/0154050 | A1* | 6/2017 | Reimer ............... G06F 16/2322 |
| 2017/0250997 | A1* | 8/2017 | Rostamabadi ...... H04L 63/1425 |
| 2018/0357422 | A1* | 12/2018 | Telang ................. G06F 21/577 |
| 2020/0026511 | A1* | 1/2020 | Swierc ....................... G06F 8/71 |
| 2021/0092162 | A1* | 3/2021 | Crabtree ............... G06F 21/577 |

FOREIGN PATENT DOCUMENTS

KR 1020130129184 A 11/2013

OTHER PUBLICATIONS

PCT Apr. 29, 2020 International Search Report and Written Opinion of the International Searching Authority from International Application No. PCT/US2019/068937; 10 pages.
PCT Jul. 29, 2021 International Preliminary Report on Patentability from International Application No. PCT/US2019/068937; 7 pages.

* cited by examiner

*Primary Examiner* — Josnel Jeudy
(74) *Attorney, Agent, or Firm* — Patent Capital Group

(57) ABSTRACT

Particular embodiments described herein provide for an electronic device that can be configured to identify a file, determine a polyglotness score for the file, where the polyglotness score is an indicator of whether or not the file is a polyglot file, and analyze the file for the presence of malware if the polyglotness score satisfies threshold.

20 Claims, 10 Drawing Sheets

DETECTION OF MALICIOUS POLYGLOT FILES

TECHNICAL FIELD

This disclosure relates in general to the field of information security, and more particularly, to the detection of malicious polyglot files.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth examples of apparatuses, methods, and systems relating to the detection of malicious polyglot files in accordance with an embodiment of the present disclosure. A malicious polyglot files is a polyglot file that includes malware. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
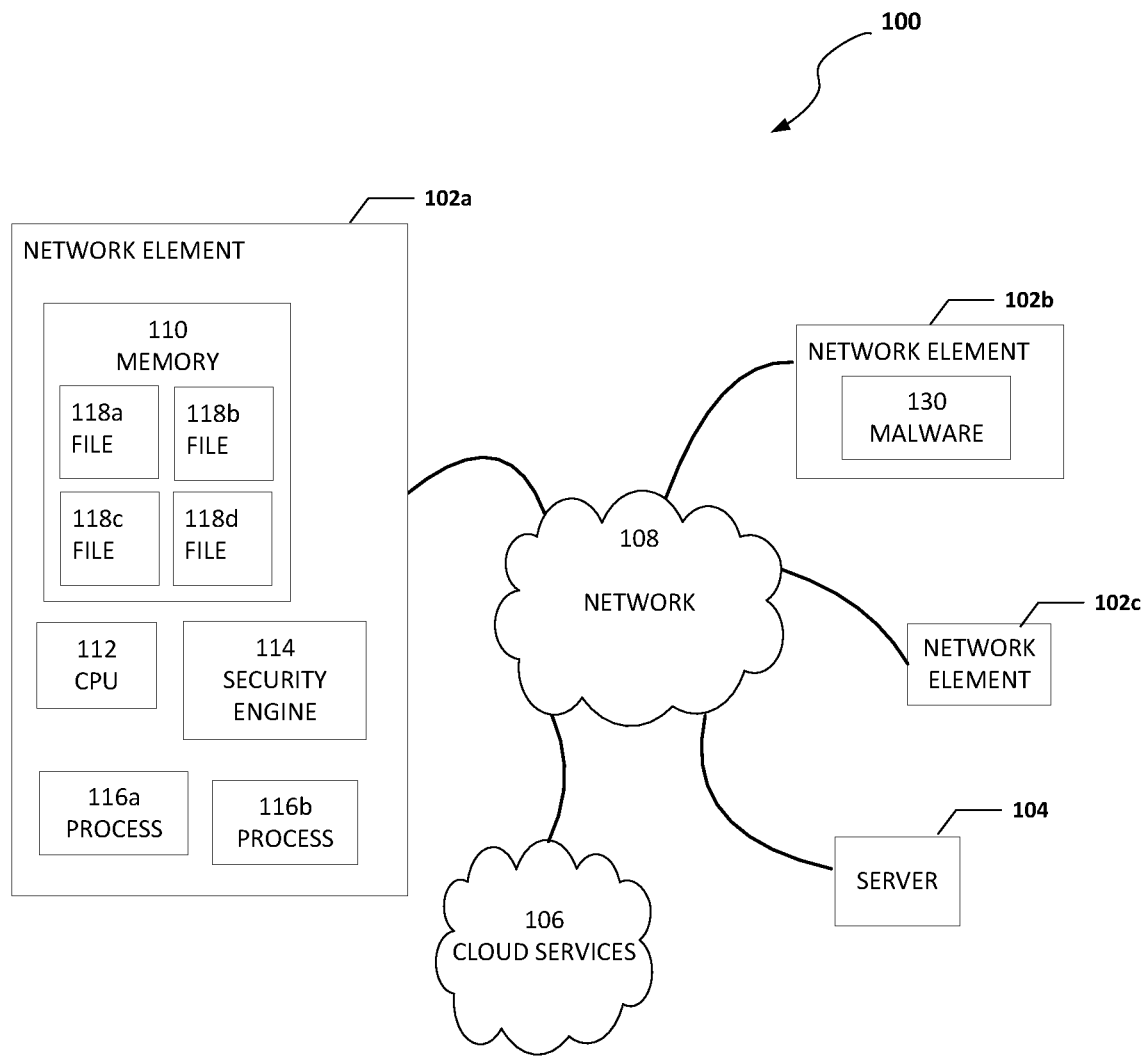
FIG. 1 is a simplified block diagram of a system to help facilitate the detection of malicious polyglot files in accordance with an embodiment of the present disclosure.

FIG. 1 is a simplified block diagram of a system 100 to help facilitate the detection of malicious polyglot files in accordance with an embodiment of the present disclosure. As illustrated in FIG. 1, an embodiment of system 100 can include network elements 102a-102c, a server 104, and cloud services 106. Network elements 102a-102c, server 104, and cloud services 106 may be in communication with each other using network 108.

Each network element 102a-102c can include memory, a computer processing unit (CPU), a security engine, and one or more processes. For example, as illustrated in FIG. 1, network element 102a includes memory 110, one or more CPUs 112, a security engine 114, and one or more processes 116a and 116b. In addition, memory can one or more files. For example, as illustrated in FIG. 1, memory 110 can include one or more files 118a-118d. One or more of files 118a-118d may be a polyglot file.

Generally, a polyglot file is a computer file that conforms to more than one format specification at the same time. For example, a polyglot file may be a GIF file that is also a valid JavaScript file, or a PDF file that is also a valid ZIP file. Crafting a malicious polyglot file takes effort but a polyglot file is an extremely effective way of bypassing existing security systems. Because polyglot files behave in different but valid ways, some security systems are unable to identify the polyglot file when the polyglot file is opened in a regular way (e.g. a picture opened with an image viewer). However, when the malicious operator invokes the polyglot file in a particularly different way, the concealed behavior of the polyglot file is revealed. In an example, network element 102b can include malware 130. A malicious polyglot file (e.g., file 118d) that includes malware 130 may be located in memory 110. Security engine 114 can be configured to help to detect the malicious polyglot file (i.e., a polyglot file that includes malware 130).

Elements of FIG. 1 may be coupled to one another through one or more interfaces employing any suitable connections (wired or wireless), which provide viable pathways for network (e.g., network 108) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting computers and computer networks from malicious and inadvertent exploitation by malicious software and devices. One-way malicious operators can infect a host computer is to use a polyglot file.

Existing security systems such as signature-based scanners often fail to detect polyglot files mainly because polyglot files are created using whitelisted or trusted formats and hosts (e.g., multimedia files) and because the malicious content is polygloted in such a way that not even partial signatures can be matched. While file-less security systems might detect the consequences of execution of a polyglot file, the file-less security systems may not necessarily detect the polyglot file itself in its inactive state. Also, polyglot files can be used in scenarios where they are not easily detected by file-less security systems such as data exfiltration, piracy, command and control, etc. Therefore, what is needed is a system and method to help detect malicious polyglot files.

A system and method to help detect malicious polyglot files, as outlined in FIG. 1, can resolve these issues (and others). Using security engine 116, system 100 can be configured to detect polyglots using a combination of format specification analysis, data structure decomposition, programming language estimation, and sandboxed testing. System 100 can be flexible enough to help detect polyglot files by combining and cascading different techniques, including data decomposition, block comment discovery, programming language estimation, theory testing via sandbox, etc. to produce a polyglotness score. The term "polyglotness scores" includes a score, ranking, or some type of indicator associated with a file that indicates whether or not a file resembles a polyglot file and/or the likelihood that the file is a polyglot file. The lower the polyglotness score, the less the file resembles a polyglot file and the higher the polyglotness score, the more the file resembles a polyglot file. For example, as a file is analyzed, the more the file resembles a polyglot file, the more the polyglotness score increases. There are many kinds of polyglot files, including concatenation-based polyglot files where the malicious element follows or precedes the original element and host-parasite polyglot files where the malicious element is embedded into the original element and can be executed, for example as a script. Although system 100 is specifically designed for host-parasite (invocation-friendly) polyglot file detection, system 100 can also help with the detection of other types of polyglot files.

As mentioned above, existing security systems, such as signature-based scanners, typically fail to detect polyglot files, either because the polyglot file is based on a trusted, ignored, unsupported, etc. file format (e.g. GIF) or because the security systems cannot match any signature with the polyglot file because of the dual nature of the polyglot file being two or more valid files at the same time. In an illustrative example to try and detect a polyglot file, a file is initially passed to a security engine. The security engine determines the type of file (PNG, PDF, GIF, ZIP, etc.) based on a data structure analysis of the file and matching the data structure to a specification. This process is essentially attempting to recognize markers and structures of the file that can be matched to a known file type defined by a file specification. For example, the GIF file specification states that a GIF file will contain a start of file (SoF) marker, a color palette marker, and an end of file (EoF) marker, among other elements.

Once the file type has been determined, key elements (per the related specification) are searched in the file. Most of the time, the key elements would be the SoF and EoF. In some file specifications, additional unique elements could be identified (e.g., global and local color palette for GIF files, cross-reference table for PDF files, quantization and huffman tables for JPG files, etc.). If one of these key elements is found more than one time (e.g., EoF is found twice), or if one key mandatory element is missing per the specification for the file (e.g., a file identified as a GIF file is missing a global and local color palette, a file identified as a PDF is missing a cross-reference table, a file identified as a JPG file is missing a quantization and huffman table, etc.), then the polyglotness score of the file is increased (e.g., polyglotness score is increased by 1). A mandatory element that is missing may not necessarily break the file (the file may still be able to open and be read) but a missing mandatory element can be an indication of a polyglot file.

In the case where an EoF marker is found more than once, an extraction process can be triggered. The extraction process can create a new temporal file that includes an excerpt of the content in the file that was between the first occurrence of the EoF and the next occurrence of a SoF or EoF. The technique of including multiple occurrences of EoF markers is known as a shielded polyglot. A shielded polyglot tries to camouflage the fact that the file is a polyglot file by re-creating a footer of the original file after embedding the malicious content in the file. Once the temporal file has been created, the temporal file can be analyzed by system 100 to help determine if the temporal file is a malicious polyglot file.

Security engine 114 can be configured to search for the presence of "start of comment" symbols in the first twenty

(20) bytes of the file. The "start of comment" is a symbol or combination of symbols used in programming languages to ignore a content section. This can include /*, <#, //, ', "", etc. according to the programming language and specification of the file. System 100 can focus only on script-based programming languages such as JavaScript, PowerShell, Shell, Python, etc. because they are the most popular programming languages among polyglots, although other languages could be included as well. In addition, security engine 114 can be configured to search for the presence of "end of comment" symbols in the last twenty (20) bytes of the file. It is important to note that the "end of comment" symbol should match the programming language of the "start of comment" symbol, if one was discovered.

If both "start of comment" and "end of comment" symbols are found and their programming language matches, then security engine 114 can be configured to search for reasonable strings inside the boundaries of the start/end of comment symbols. A string is a contiguous sequence of symbols or values, such as a character string (a sequence of characters), a binary digit string (a sequence of binary values), or some other sequence. A reasonable string is a string that matches or complies with some criteria of being a potential source code string. For example, a reasonable string can be defined as a string that has a length of at least ten (10) characters or at least ten (10) consecutive printed characters.

For each reasonable string found, a programming language estimator can be used to determine what is the most probable programming language represented by the string, if any. A programming language estimator is a machine learning based model or engine that classifies text with a probability of being one of several programming languages. The program language estimator can be "trained" using a large number (e.g., thousands) of examples of known source code for specific programing languages (e.g., snippets of code in Javascript, C++, Java, Python, PowerShell, etc.) and identifying common features in the examples of know source code for the specific programing language.

For each reasonable string found, the programming language estimator can be configured to extract key features (e.g., most common words, structure of the symbols, how each line ends, etc.) and based on the extracted key features, predict in what programming language the reasonable string is written or with what programming language the reasonable string is associated If a string classifies as potential source code, executable code, or similar type code, (e.g., as base64 code), the polyglotness score is incremented (e.g., polyglotness score is incremented by two). After determining what is the most probable programming language, a sandbox environment for the most probable programming language can be created. The sandbox environment is used to test the theory that the file is a script-based polyglot. Inside the sandbox environment, the original file can be invoked or executed using the estimated programming language (e.g. PowerShell). If the invocation was successful (e.g., no fatal errors were produced, the execution produces a change or changes in the system or would produce change or changes to the system if executed outside of the sandbox, etc.), then the file is flagged as polyglot and assigned a maximum polyglotness score. If the invocation of the file fails or otherwise produces an error, the existing polyglotness score is unchanged.

The polyglotness score is calculated as the score obtained by the file plus the score obtained by any temporal file or files extracted from the file. The final polyglotness score is useful to classify the file and to determine if proper remediation action needs to be taken. Even a suspicious or potential polyglot score is useful to trigger a threat monitoring and/or prevention process. For example, if a file has been classified as suspicious, passing the suspicious file as an argument of a PowerShell or Python command should be blocked. The score values discussed herein are only for reference purposes and may be different.

Turning to the infrastructure of FIG. 1, system 100 in accordance with an example embodiment is shown. Generally, system 100 can be implemented in any type or topology of networks. Network 108 represents a series of points or nodes of interconnected communication paths for receiving and transmitting packets of information that propagate through system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102a-102c can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. Server 104 can be a network element such as a server or virtual server and can be associated with clients, customers, endpoints, or end users wishing to initiate a communication in system 100 via some network (e.g., network 108). The term 'server' is inclusive of devices used to serve the requests of clients and/or perform some computational task on behalf of clients within system 100. Cloud services 106 is configured to provide cloud services to network elements 102a-102c. Cloud services may generally be defined as the use of computing resources that are delivered as a service over a network, such as the Internet. Typically, compute, storage, and network resources are offered in a cloud infrastructure, effectively shifting the workload from a local network to the cloud network. Network elements 102a-102c may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network elements 102a-102c, server 104, and cloud services 106 can include memory elements (e.g., memory 110) for storing information to be used in the operations outlined herein. Each of network elements 102a-102c, server 104, and cloud services 106 may keep information in any suitable memory element (e.g., disk, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102a-102c, server 104, and cloud services 106 may include software modules (e.g., security engine 114) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102a-102c, server 104, and cloud services 106 may include a processor (e.g., CPU 112) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
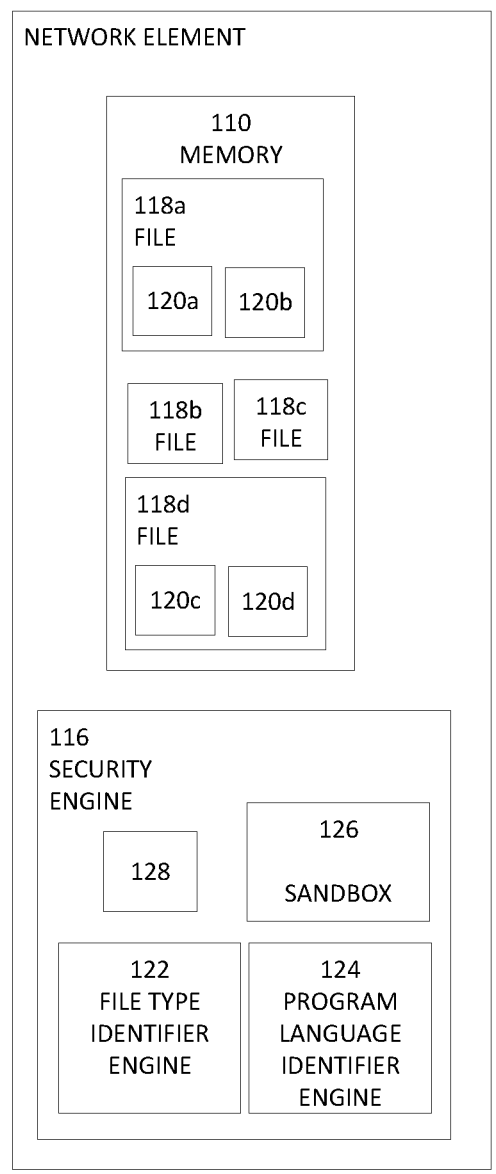
FIG. 2 is a simplified block diagram of a portion of a system to help facilitate the detection of malicious polyglot files in accordance with an embodiment of the present disclosure.

Turning to FIG. 2, FIG. 2 is a simplified block diagram of a portion of a system 100 to help facilitate the detection of malicious polyglot files in accordance with an embodiment of the present disclosure. In an example, network element 102b can include memory 110, CPU 112, processes 114a and 114b, and security engine 116. Memory 110 can include files 118a-118d. One or more of files 118a-118d may be a polyglot file. For example, files 118a and 118d are illustrated as having more than one type of executable code. More specifically, file 118a can include executable code 120a and 120b. Executable code 120a may be GIF related executable code and executable code 120b may be JavaScript related executable code. In addition, file 118d can include executable code 120c and 120d. Executable code 120c may be JPG related executable code and executable code 120d may be malware related executable code.

Security engine 116 can include a file type identifier engine 122, a program language identifier engine 124, a sandbox 126, and a polyglotness score 128. Polyglotness score 128 can be associated with a specific file (e.g., file 118a, file 118b, file 118c, or file 118d) and can help indicate a likelihood of a file being a polyglot file. For example, a polyglotness score of zero can indicate a clean file, a polyglotness score of one can indicate that the file is suspicious and may be a polyglot file, a polyglotness score greater than one can indicate that the file is potentially a polyglot file, and a maximum polyglotness score (e.g., a polyglotness score of three) can indicate that the file is definitely a polyglot file. The score values discussed herein are only for reference purposes and different scores, values, rankings, numbers, etc. may be used. Even a suspicious or potential polyglot score is useful to trigger a threat monitoring/prevention process. Using security engine 116, system 100 can be configured to detect a polyglot file using a combination of format specification analysis, data structure decomposition, programming language estimation, and sandboxed testing.

In an illustrative example, a file (e.g., file 118d) is passed to security engine 116. File type identifier engine 122 can be configured to determine a file type for the file (e.g., PNG, PDF, GIF, ZIP, etc.). In an illustrative example, file type identifier engine 122 can be configured to determine the type based on data structure analysis of the file and matching the data structure of the file to specifications for different file types. File type identifier engine 122 can be configured to recognize markers and structures that can be matched to a known file type. For example, a GIF file will contain a SoF marker, a color palette marker, and an EoF marker, among other elements. If a file includes a SoF marker, a color palette marker, and an EoF marker, then file type identifier engine 122 will identify the file as a GIF file.

Once the file type of the file is determined, strings in the file are identified. For each string found, program language identifier engine 124 can be configured to analyze a string (e.g., executable code 120c) and determine what is the most probable programming language represented by the string, if any. Program language identifier engine 124 can be a machine learning based engine that classifies text in the string with a probability of being one of several programming languages.

Sandbox 126 can be specifically created for the most probable programming language represented by the string and can provide a tightly controlled set of resources to be used to execute the file and/or string in the file. Sandbox 126 can be implemented by executing the file and/or string in the file in a restricted operating system environment, thus controlling the resources (e.g., file descriptors, memory, file system space, etc.) that the file and/or string may use. Memory usage, network access, the ability to inspect the host system or read from input devices, and other resources and functions of the file and/or string can be disallowed or heavily restricted.

Figure 3:
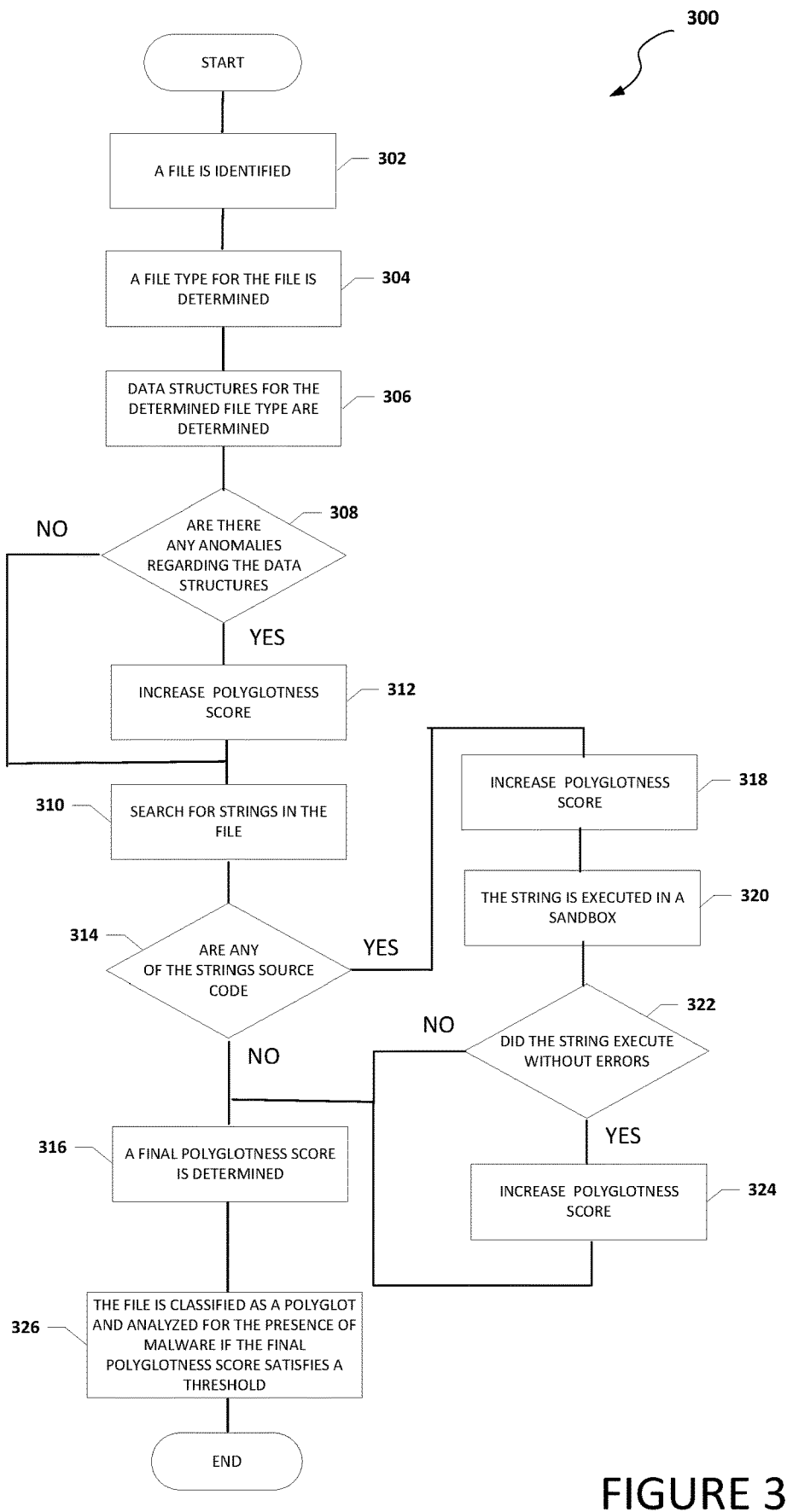
FIG. 3 is a simplified flowchart illustrating potential operations that may be associated with the system in accordance with an embodiment.

Turning to FIG. 3, FIG. 3 is an example flowchart illustrating possible operations of a flow 300 that may be associated with the detection of malicious polyglot files, in accordance with an embodiment. In an embodiment, one or more operations of flow 300 may be performed by security engine 116. At 302, a file is identified. In an example, the file may be a temporal file. At 304, a file type for the file is determined. At 306, data structures for the determined file type are determined. In an example, the data structures may be key data structures as per a specification related to the file type, data structures that are suggested as per a specification related to the file type, and/or essential data structures that are required for the file to execute. At 308, the system determines if there are any anomalies regarding the data structures. For example, based on the data structures determined for the file, a data structure may be unnecessarily duplicated, the file may contain a data structure that is not typically found in the file type, the file may be missing a data structure, etc. If there are no anomalies regarding the data structures, then a search for strings in the file is performed, as in 310. If there are anomalies regarding the data structures, then a polyglotness score is increased, as in 312, and a search for strings in the file is performed, as in 310.

At 314, the system determines if any of the strings are source code. If none of the strings are source code, then a final polyglotness score is determined, as in 316. If any of the strings are source code, then the polyglotness score is increased, as in 318. At 320, the string is executed in a sandbox. At 322, the system determines if the string executed without errors when the string was executed in the sandbox. If the string executed without errors when the string was executed in the sandbox, then the polyglotness score is increased, as in 324. If the string executed without errors, then the string is valid code that is hidden in the file and is a clear example of a polyglot file. If the string did not execute without errors (i.e., the string did not execute or executed with errors) when the string was executed in the sandbox, a final polyglotness score is determined, as in 316. If the string executed with errors, then the string is not valid or executable code and it may be an error or mistake that the string was included in the file. At 326, the file is classified as a polyglot and analyzed for the presence of malware if the polyglotness score satisfies a threshold. For example, each time the polyglotness score is increased, it may be increased by one (or some other value). In an example, the threshold value may be one, two, or some other value set by an administrator. In an illustrative example, if the threshold value is one or two, a polyglotness score of zero can indicate a clean file, a polyglotness score of one can indicate that the file is suspicious and may be a polyglot file, a polyglotness score greater than one can indicate that the file is potentially a polyglot file, and a maximum polyglotness score (e.g., a polyglotness score of three) can indicate that the file is definitely a polyglot file. If the threshold value is one, then suspicious files with a polyglotness score of one can be further analyzed or remedial action can be taken. If the threshold value is two, then files that are potentially a polyglot with a polyglotness score of two can be further analyzed or remedial action can be taken. The score values discussed herein are only for reference purposes and different scores, values, rankings, numbers, etc. may be used. Even a suspicious or potential polyglot score is useful to trigger a threat monitoring/prevention process.

Figure 4:
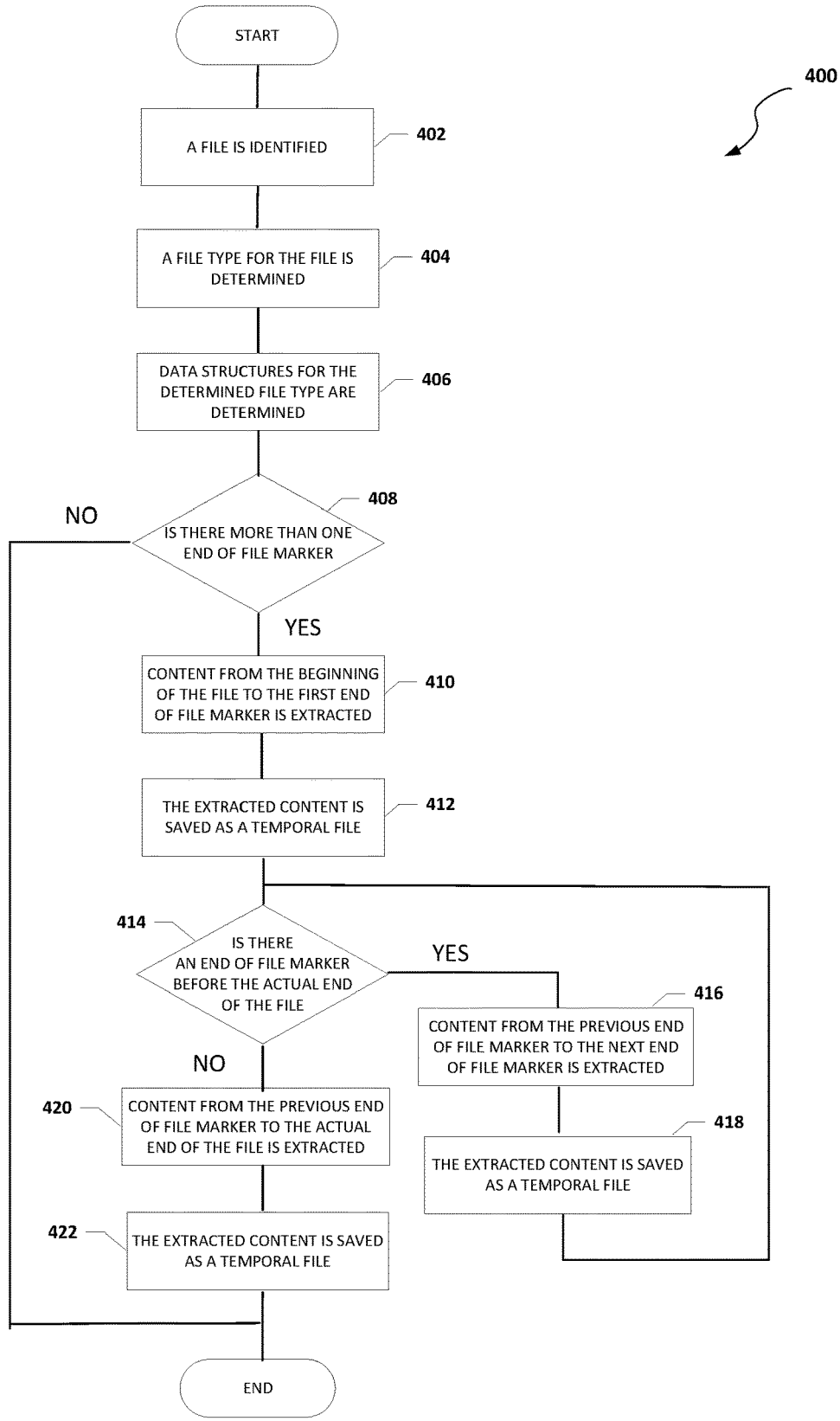
FIG. 4 is a simplified flowchart illustrating potential operations that may be associated with the system in accordance with an embodiment.

Turning to FIG. 4, FIG. 4 is an example flowchart illustrating possible operations of a flow 400 that may be associated with the detection of malicious polyglot files, in accordance with an embodiment. In an embodiment, one or more operations of flow 400 may be performed by security engine 116. At 402, a file is identified. At 404, a file type for the file is determined. At 406, data structures for the determined file type are determined. At 408, the system determines if there is more than one EoF marker. If there is not more than one EoF marker then the process ends. If there is more than one EoF marker, then content from the beginning of the file to the first EoF marker is extracted, as in 410. At 412, the extracted content is saved as a temporal file. At 414, the system determines if there is an EoF marker before the actual end of the file. If there is an EoF marker before the actual end of the file, then content from the previous EoF marker to the next EoF marker is extracted, as in 416. At 418, the extracted content is saved as a separate temporal file and the system returns to 414 and determines if there is an EoF marker before the actual end of the file. If there is not an EoF marker before the actual end of the file, then the content from the previous EoF marker to the actual end of the file is extracted, as in 420. At 422, the extracted content is saved as a separate temporal file. The temporal files can be analyzed and assigned a polyglotness score and the assigned polyglotness score be added to the polyglotness score for the file.

Figure 5:
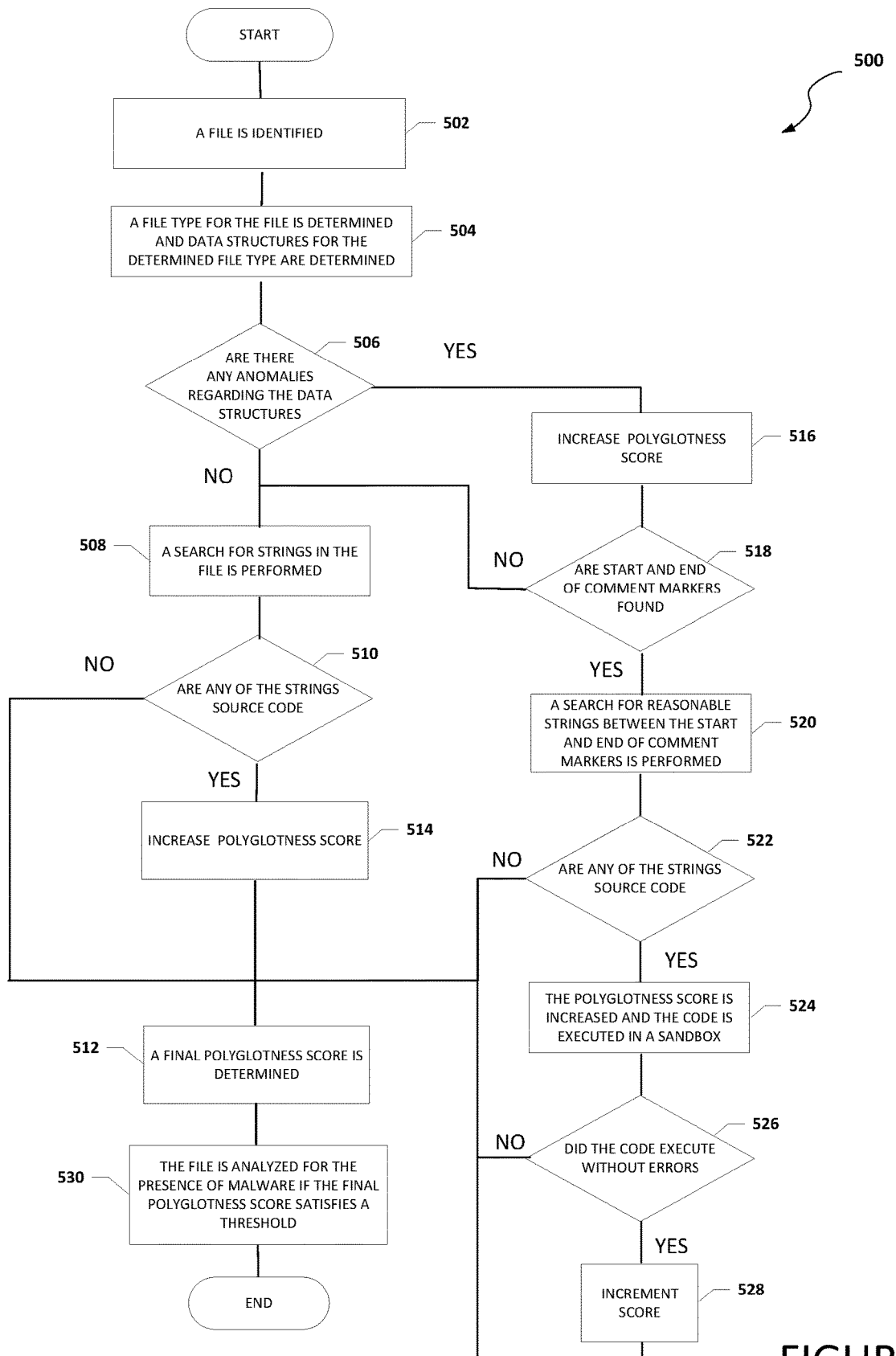
FIG. 5 is a simplified flowchart illustrating potential operations that may be associated with the system in accordance with an embodiment.

Turning to FIG. 5, FIG. 5 is an example flowchart illustrating possible operations of a flow 500 that may be associated with the detection of malicious polyglot files, in accordance with an embodiment. In an embodiment, one or more operations of flow 500 may be performed by security engine 116. At 502, a file is identified. At 504, a file type for the file is determined and data structures for the determined file type are determined. At 506, the system determines if there are any anomalies regarding the data structures of the file. If there are not any anomalies regarding the data structures of the file, then a search for strings in the file is performed, as in 508. At 510, the system determines if any of the strings are source code. If none of the strings are source code, then a final polyglotness score is determined, as in 512. If any of the strings are source code, then the polyglotness score is increased, as in 514 and a final polyglotness score is determined, as in 512.

Going back to 506, If there are any anomalies regarding the data structures of the file, then the polyglotness score is increased, as in 516. At 518, the system determines if start and end of comment markers are found. If start and end of comment markers are not found, then a search for strings in the file is performed, as in 508. If start and end of comment markers are found, then a search for strings between the start and end of comment markers is performed, as in 520. At 522, the system determines if any of the strings found between the start and end of comment markers are source code. If any of the strings found between the start and end of comment markers are not source code, then a final polyglotness score is determined, as in 512. If any of the strings found between the start and end of comment markers are source code, then the polyglotness score is increased and the code is executed in a sandbox, as in 524. At 526, the system determines if the string executed without errors when the string was executed in the sandbox. If the string executed without errors when the string was executed in the sandbox, then the polyglotness score is increased, as in 528. If the string executed without errors when the string was executed, then the string is valid code that is hidden in the file and is a clear example of a polyglot file. If the string did not execute without errors when the string was executed in the sandbox, then a final polyglotness score is determined, as in 512. If the string executed with errors, then the string is not valid or executable code and it may be an error or mistake that the string was included in the file. At 530, the file is analyzed for the presence of malware if the polyglotness score satisfies a threshold.

Figure 6A:
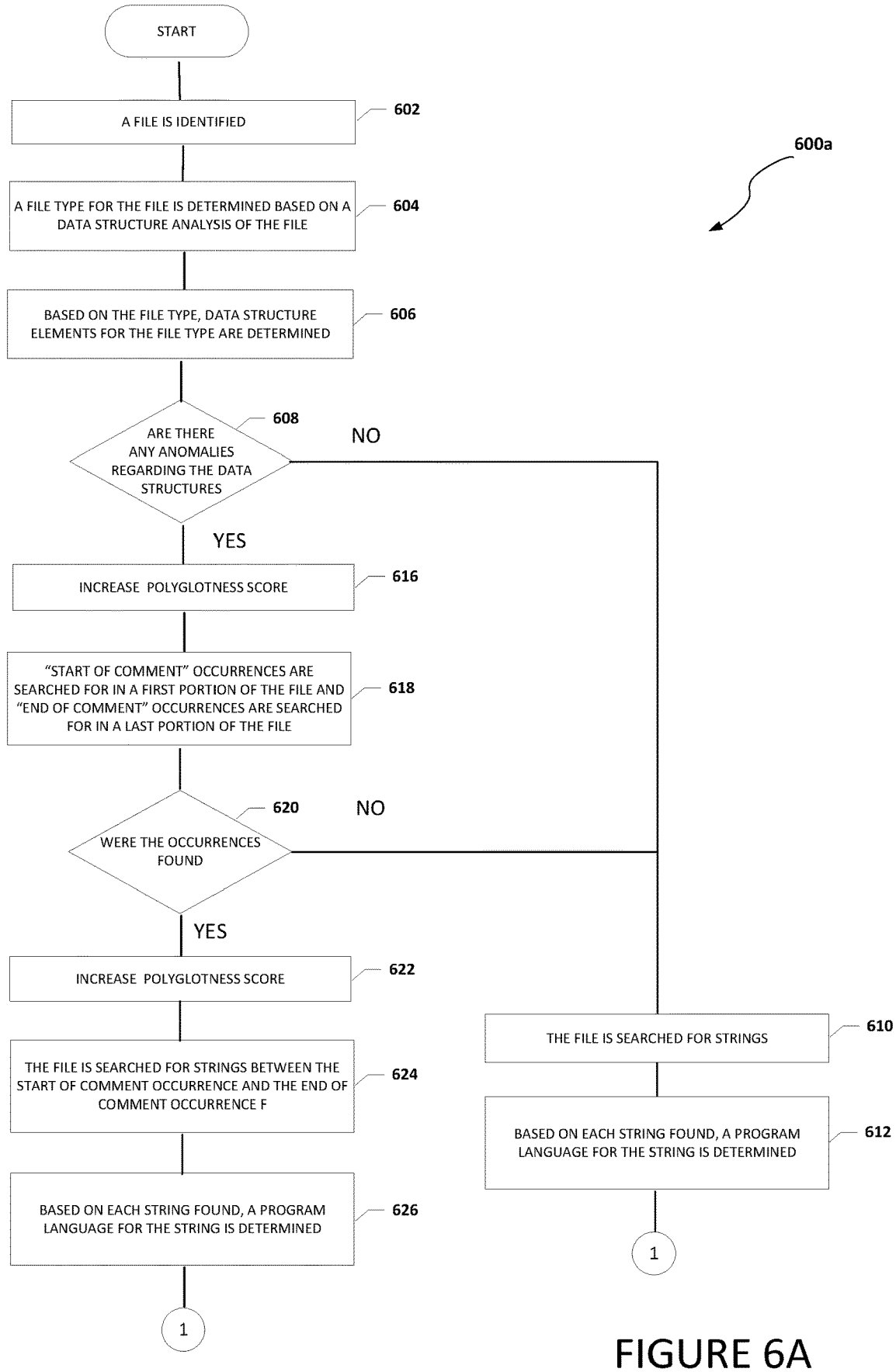
FIGS. 6A and 6B are a simplified flowchart illustrating potential operations that may be associated with the system in accordance with an embodiment.
Figure 6B:
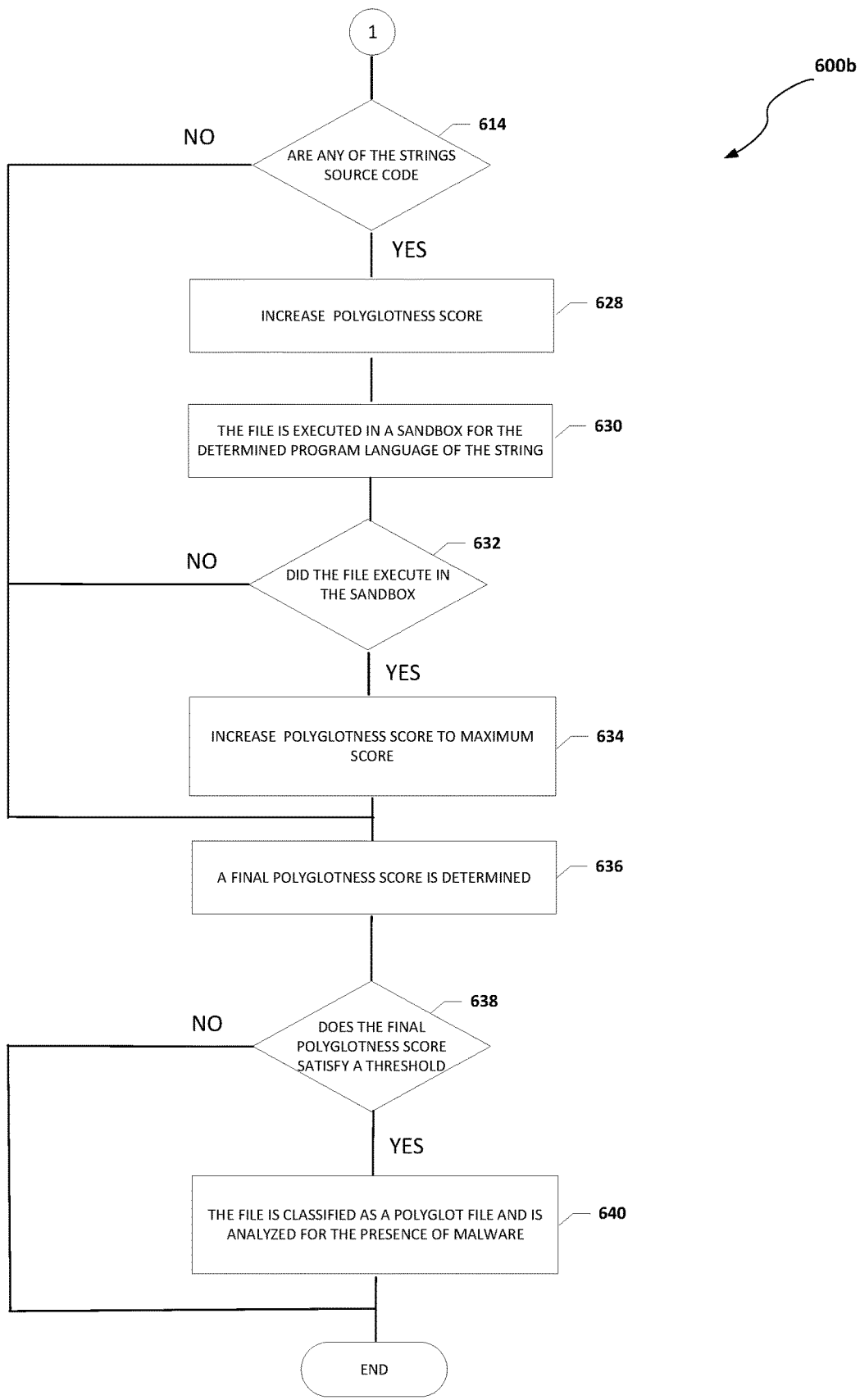

Turning to FIGS. 6A and 6B, FIGS. 6A and 6B are an example flowchart illustrating possible operations of a flow 600a and 600b that may be associated with the detection of malicious polyglot files, in accordance with an embodiment. In an embodiment, one or more operations of flow 600a and 600b may be performed by security engine 116. At 602, a file is identified. At 604, a file type for the file is determined based on a data structure analysis of the file. At 606, based on the file type, data structure elements for the file type are determined. At 608, the system determines if there are any anomalies regarding the data structure elements of the file. If there are not any anomalies regarding the data structure elements of the file, then the file is searched for strings, as in 610. At 612, based on each string found, a program language for the string is determined. At 614, (in FIG. 6B), the system determines if any of the strings are source code.

Going back to 608, if there are any anomalies regarding the data structure elements of the file, then the polyglotness score is increased, as in 616. At 618, the presence of "start of comment" occurrences are searched for in a first portion of the file and "end of comment" occurrences are searched for in a last portion of the file. In an example, the first portion may be the first twenty (20) bytes of the file and the last portion may be the last twenty (20) bytes of the file. At 620, the system determines if "start of comment" occurrences and/or "end of comment" occurrences were found. If "start of comment" occurrences and/or "end of comment" occurrences were not found, then the file is searched for strings, as in 610. If "start of comment" occurrences and/or "end of comment" occurrences were found, then the polyglotness score is increased, as in 622. At 624, the file is searched for strings between the start of comment occurrences and the end of comment occurrences. At 626, based on each string found, a program language for the string is determined.

Turning to FIG. 6B, at 614, the system determines if any of the strings are source code. If any of the strings are not source code, then a final polyglotness score is determined, as in 636. If any of the strings are source code, then the polyglotness score is increased, as in 628. At 630, the file is executed in a sandbox for a determined program language of the string. At 632, the system determines if the file executed in the sandbox. If the file did not execute in the sandbox, then a final polyglotness score is determined, as in 636. If the file did execute in the sandbox, then the polyglotness score is increased to a maximum score, as in 634. At 636, a final polyglotness score is determined. At 638 the system determines if the final polyglotness score satisfies a threshold. If the polyglotness score satisfies the threshold, then the file is classified as a polyglot and is analyzed for the presence of malware, as in 640. If the polyglotness score does not satisfy the threshold, then the process ends and another file can be analyzed to try and help with the detection of malicious polyglot files.

Figure 7:
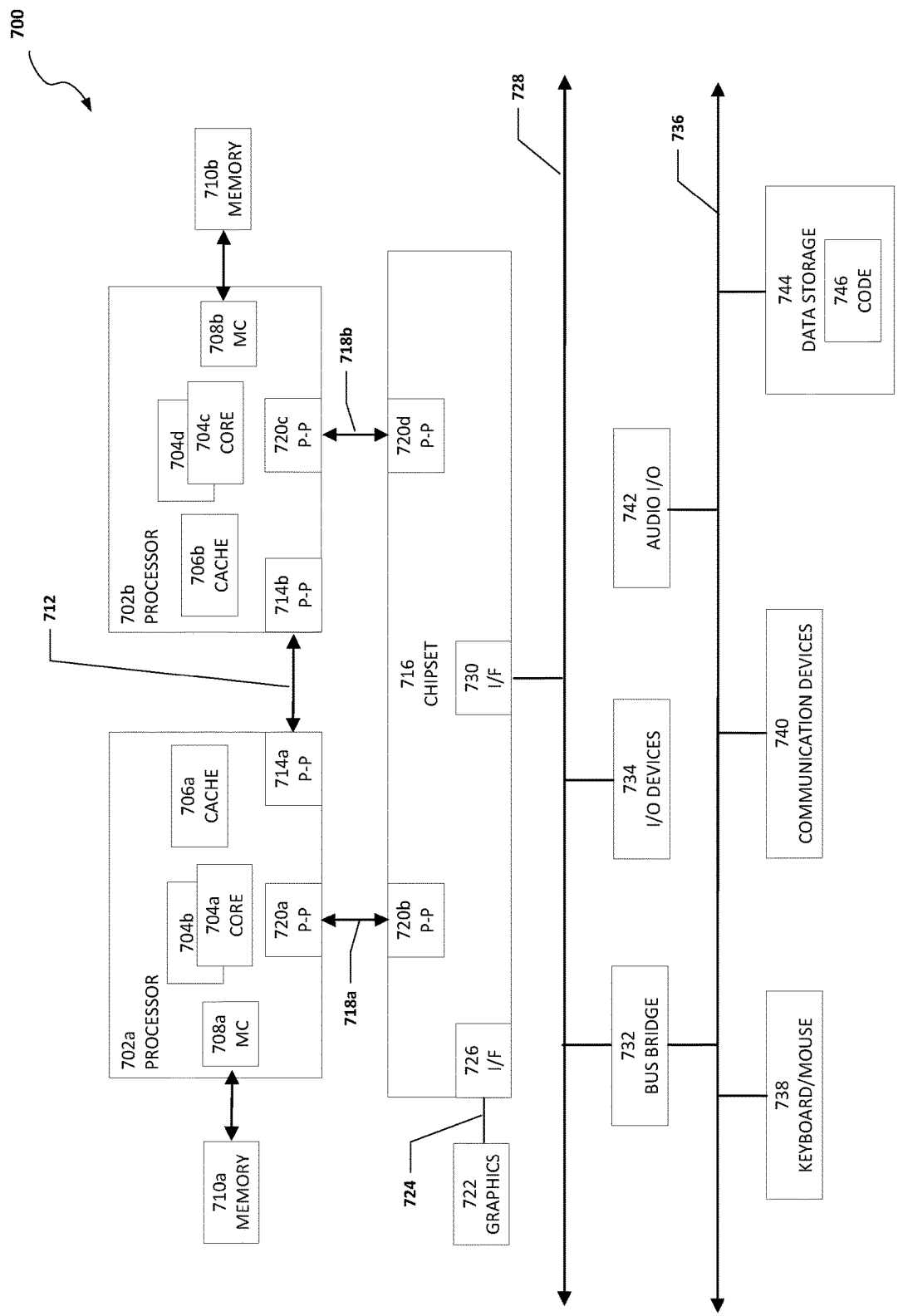
FIG. 7 is a block diagram illustrating an example computing system that is arranged in a point-to-point configuration in accordance with an embodiment.

Turning to FIG. 7, FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of system 100 may be configured in the same or similar manner as computing system 700.

As illustrated in FIG. 7, system 700 may include several processors, of which only two, processors 702a and 702b, are shown for clarity. While two processors 702a and 702b are shown, it is to be understood that an embodiment of system 700 may also include only one such processor. Processors 702a and 702b may each include a set of cores (i.e., processors cores 704a and 704b and processors cores 704c and 704d) to execute multiple threads of a program. The cores may be configured to execute instruction code in a manner similar to that discussed above with reference to FIGS. 1-8. Each processor 702a and 702b may include at least one shared cache 706a and 706b respectively. Shared caches 706a and 706b may each store data (e.g., instructions) that are utilized by one or more components of processors 702a and 702b, such as processor cores 704a and 704b of processor 702a and processor cores 704c and 704d of processor 702b.

Processors 702a and 702b may also each include integrated memory controller logic (MC) 708a and 708b respectively to communicate with memory elements 710a and 710b. Memory elements 710a and/or 710b may store various data used by processors 702a and 702b. In alternative embodiments, memory controller logic 708a and 708b may be discrete logic separate from processors 702a and 702b.

Processors 702a and 702b may be any type of processor and may exchange data via a point-to-point (PtP) interface 712 using point-to-point interface circuits 714a and 714b respectively. Processors 702a and 702b may each exchange data with a chipset 716 via individual point-to-point interfaces 718a and 718b using point-to-point interface circuits 720a-720d. Chipset 716 may also exchange data with a high-performance graphics circuit 722 via a high-performance graphics interface 724, using an interface circuit 726, which could be a PtP interface circuit. In alternative embodiments, any or all of the PtP links illustrated in FIG. 7 could be implemented as a multi-drop bus rather than a PtP link.

Chipset 716 may be in communication with a bus 728 via an interface circuit 730. Bus 728 may have one or more devices that communicate over it, such as a bus bridge 732 and I/O devices 734. Via a bus 736, bus bridge 732 may be in communication with other devices such as a keyboard/mouse 738 (or other input devices such as a touch screen, trackball, etc.), communication devices 740 (such as modems, network interface devices, or other types of communication devices that may communicate through a network), audio I/O devices 742, and/or a data storage device 744. Data storage device 744 may store code 746, which may be executed by processors 702a and/or 702b. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
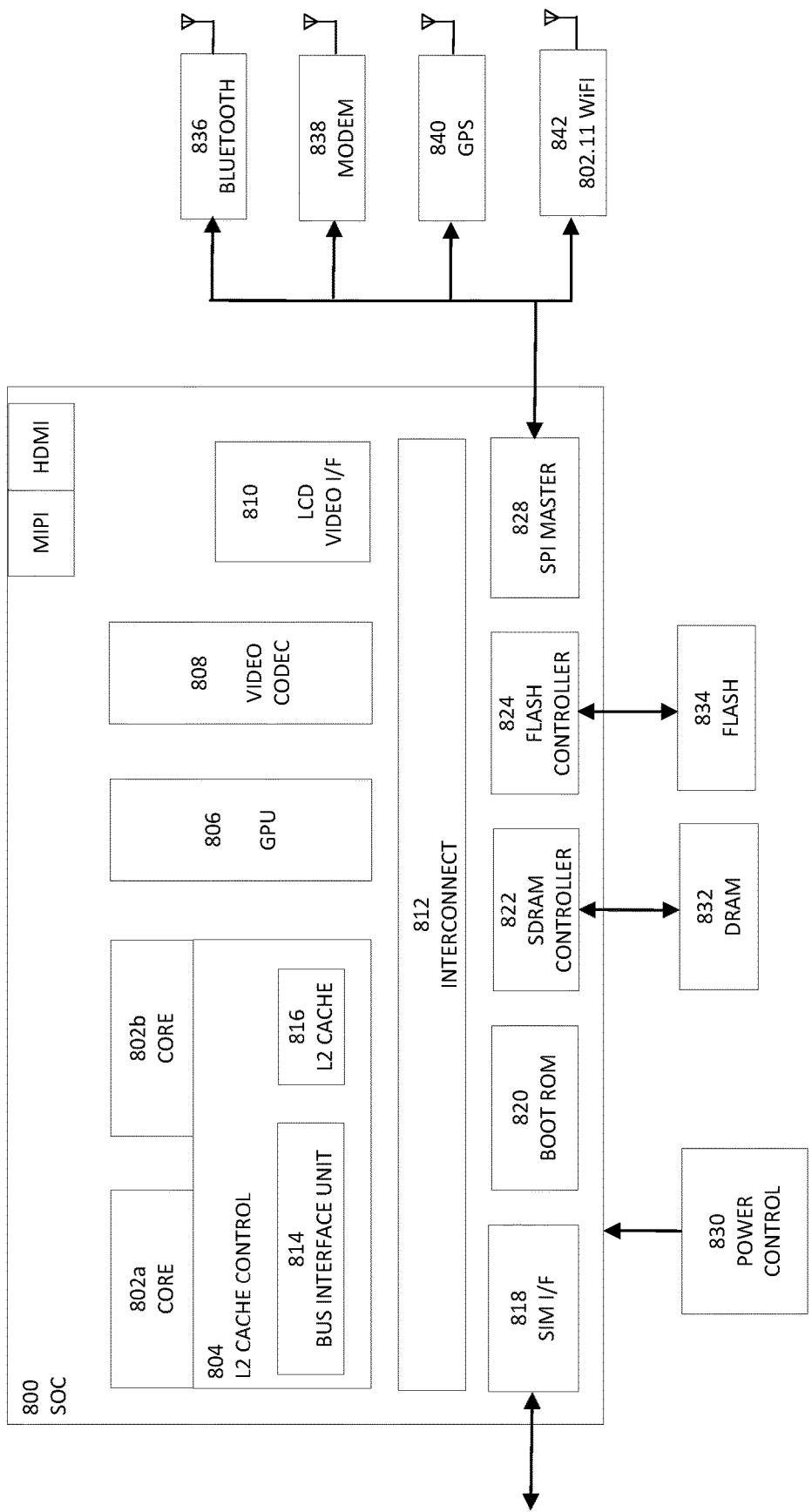
FIG. 8 is a simplified block diagram associated with an example ARM ecosystem system on chip (SOC) of the present disclosure.

Turning to FIG. 8, FIG. 8 is a simplified block diagram associated with an example ecosystem SOC 800 of the present disclosure. At least one example implementation of the present disclosure can include the device pairing in a local network features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ecosystem SOC 800 may include multiple cores 802a and 802b, an L2 cache control 804, a graphics processing unit (GPU) 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/high-definition multimedia interface (HDMI) links that couple to an LCD.

Ecosystem SOC 800 may also include a subscriber identity module (SIM) I/F 818, a boot read-only memory (ROM) 820, a synchronous dynamic random-access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth™ 836, a 3G modem 838, a global positioning system (GPS) 840, and an 802.11 Wi-Fi 842.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
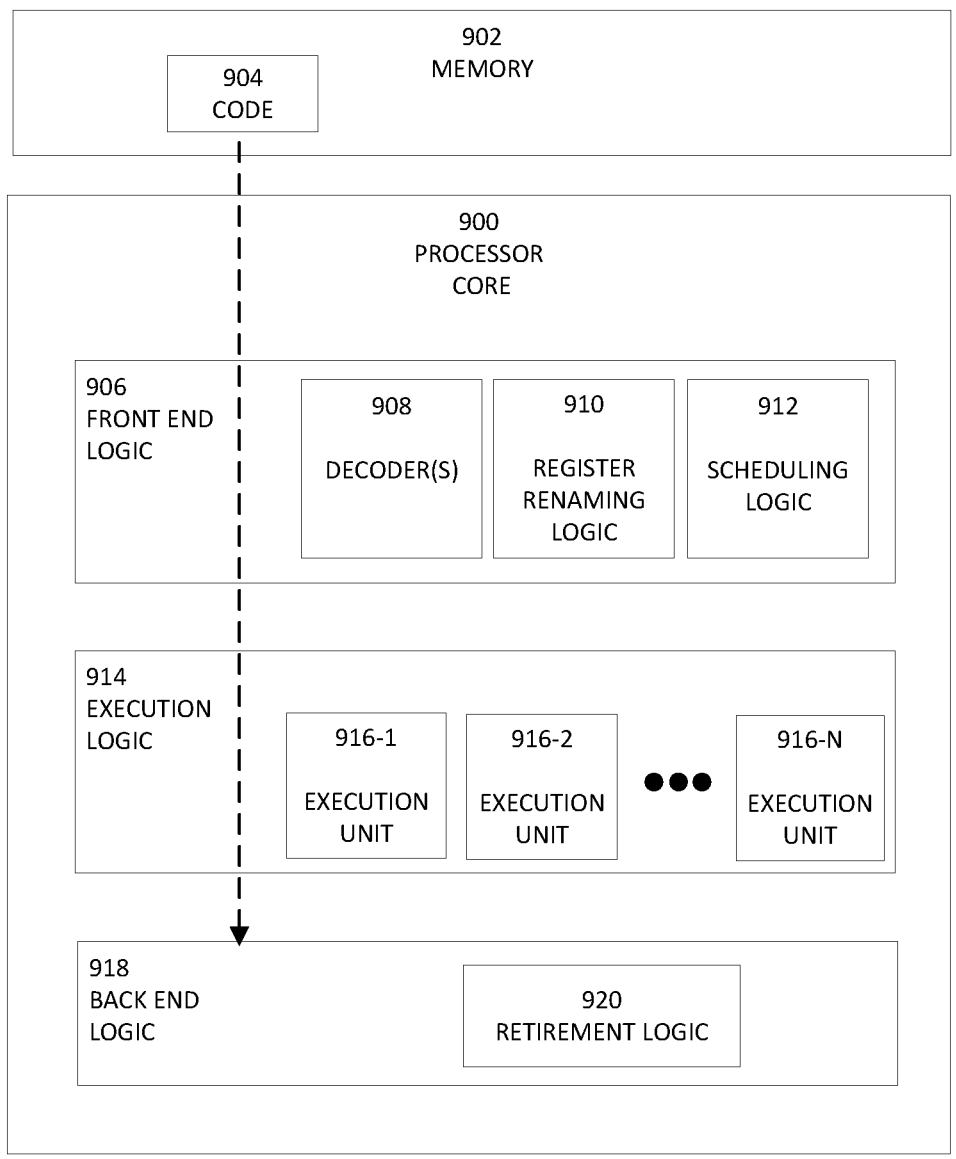
FIG. 9 is a block diagram illustrating an example processor core in accordance with an embodiment.

Turning to FIG. 9, FIG. 9 illustrates a processor core 900 according to an embodiment. Processor core 900 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 704a-704d shown and described with reference to processors 702a and 702b of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagrams (i.e., FIGS. 3-6B) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example M1 is a method including identifying a file, determining a polyglotness score for the file, where the polyglotness score is an indicator of whether or not the file is a polyglot file, and analyzing the file for a presence of malware if the polyglotness score satisfies threshold.

In Example M2, the subject matter of Example M1 can optionally include where the polyglotness score is based on a presence of anomalies to data structures of the file.

In Example M3, the subject matter of any one of the Examples M1-M2 can optionally include where the data structures of the file are determined from a file specification associated with the file.

In Example M4, the subject matter of any one of the Examples M1-M3 can optionally include analyzing markers and structures of the file that can be matched to a known file type defined by a file specification to determine the presence of anomalies to data structures of the file.

In Example M5, the subject matter of any one of the Examples M1-M4 can optionally include where the polyglotness score is based on a presence of an executable string in the file.

In Example M6, the subject matter of any one of the Examples M1-M5 can optionally include where strings identified in the file are executed in a sandbox to determine if they are executable.

In Example M7, the subject matter of any one of the Examples M1-M6 can optionally include where the polyglotness score is based on a presence of a temporal file within the file.

Example C1 is at least one machine readable storage medium having one or more instructions that when executed by at least one processor, cause the at least one processor to identify a file, determine a polyglotness score for the file, where the polyglotness score is an indicator of whether or not the file is a polyglot file, and analyze the file for a presence of malware if the polyglotness score satisfies threshold.

In Example C2, the subject matter of Example C1 can optionally include where the polyglotness score is based on a presence of anomalies to data structures of the file.

In Example C3, the subject matter of any one of Examples C1-C2 can optionally include where the data structures of the file are determined from a file specification associated with the file.

In Example C4, the subject matter of any one of Examples C1-C3 can optionally include where the one or more instructions that when executed by the at least one processor, further cause the processor to analyze markers and structures of the file that can be matched to a known file type defined by a file specification to determine the presence of anomalies to data structures of the file.

In Example C5, the subject matter of any one of Examples C1-C4 can optionally include where the polyglotness score is based on a presence of an executable string in the file.

In Example C6, the subject matter of any one of Example C1-05 can optionally include where strings identified in the file are executed in a sandbox to determine if they are executable.

In Example C7, the subject matter of any one of Examples C1-C6 can optionally include where the polyglotness score is based on a presence of a temporal file within the file.

In Example A1, an apparatus can include a security engine. The security engine can be configured to identify a file, determine a polyglotness score for the file, where the polyglotness score is an indicator of whether or not the file is a polyglot file, and analyze the file for a presence of malware if the polyglotness score satisfies threshold.

In Example, A2, the subject matter of Example A1 can optionally include where the polyglotness score is based on a presence of anomalies to data structures of the file.

In Example A3, the subject matter of any one of Examples A1-A2 can optionally include where the security engine if further configured to analyze markers and structures of the file that can be matched to a known file type defined by a file specification to determine the presence of anomalies to data structures of the file.

In Example A4, the subject matter of any one of Examples A1-A3 can optionally include where the polyglotness score is based on a presence of an executable string in the file.

In Example A5, the subject matter of any one of Examples A1-A4 can optionally include where strings identified in the file are executed in a sandbox to determine if they are executable.

In Example A6, the subject matter of any one of Examples A1-A5 can optionally include where the polyglotness score is based on a presence of a temporal file within the file.

Example S1 is a system for the identification of a polyglot file, the system including a computer processing unit, memory, and a security engine. The security engine configured to identify a file, determine a polyglotness score for the file, where the polyglotness score is an indicator of whether or not the file is a polyglot file, and analyze the file for a presence of malware if the polyglotness score satisfies threshold.

In Example S2, the subject matter of Example S1 can optionally include where the polyglotness score is based on a presence of anomalies to data structures of the file.

In Example S3, the subject matter of any of the Examples S1-S2 can optionally include where the data structures of the file are determined by an analysis based on an identified data structure of the file and matching the identified data structure to a file specification.

In Example S4, the subject matter of any of the Examples S1-S3 can optionally include where the security engine is further configured to analyze markers and structures of the file that can be matched to a known file type defined by a file specification to determine the presence of anomalies to data structures of the file.

In Example S5, the subject matter of any of the Examples S1-S4 can optionally include where the polyglotness score is based on a presence of an executable string in the file.

In Example S6, the subject matter of any of the Examples S1-S5 can optionally include where strings identified in the file are executed in a sandbox to determine if they are executable.

In Example S7, the subject matter of any of the Examples S1-S6 can optionally include where the polyglotness score is based on a presence of a temporal file within the file.

Example AA1 is an electronic device including means for means for identifying a file, means for determining a polyglotness score for the file, where the polyglotness score is an indicator of whether or not the file is a polyglot file, and means for analyzing the file for a presence of malware if the polyglotness score satisfies a threshold.

In Example AA2, the subject matter of Example AA1 can optionally include where the polyglotness score is based on a presence of anomalies to data structures of the file.

In Example AA3, the subject matter of any one of Examples AA1-AA2 can optionally include where the data structures of the file are determined by identifying a data structure of the file and matching the data structure to a file specification.

In Example AA4, the subject matter of any one of Examples AA1-AA3 can optionally include means for analyzing markers and structures of the file that can be matched to a known file type defined by a file specification to determine the presence of anomalies to data structures of the file.

In Example AA5, the subject matter of any one of Examples AA1-AA4 can optionally include where the polyglotness score is based on a presence of an executable string in the file.

In Example AA6, the subject matter of any one of Examples AA1-AA5 can optionally include where strings identified in the file are executed in a sandbox to determine if they are executable.

In Example AA7, the subject matter of any one of Example AA1-AA6 can optionally include where the polyglotness score is based on a presence of a temporal file within the file.

Example MM1 is a method including identifying a file, determining a polyglotness score for the file, where the polyglotness score corresponds to a likelihood that the file is a polyglot file, and analyzing the file for a presence of malware if the polyglotness score satisfies threshold.

Example AAA1 is an electronic device including means for means for identifying a file, means for determining a polyglotness score for the file, where the polyglotness score corresponds to a likelihood that the file is a polyglot file, and means for analyzing the file for a presence of malware if the polyglotness score satisfies a threshold.

Example X1 is a machine-readable storage medium including machine-readable instructions to implement a method or realize an apparatus as in any one of the Examples A1-A7, AA1-AA7, AAA1, M1-M7, or MM1. Example Y1 is an apparatus comprising means for performing of any of the Example methods M1-M7 and MM1. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising: identifying a file; determining a likelihood that the file is a polyglot file, wherein the determination includes analyzing the file using at least two of: a format specification analysis of the file, a data structure decomposition of the file, a program language estimation to determine a program language that was used to write at least part of the file, and a sandboxed test of at least a portion of the file; determining a polyglotness score for the file, wherein the polyglotness score corresponds to the likelihood that the file is a polyglot file; and analyzing the file for a presence of mal are when the polyglotness score satisfies a threshold.

2. The method of claim 1, wherein the polyglotness score is based on a presence of anomalies to data structures of the file.

3. The method of claim 2, wherein the data structures of the file are determined from a file specification associated with the file.

4. The method of claim 2, further comprising:
analyzing markers and structures of the file that match a known file type defined by a file specification to determine the presence of anomalies to data structures of the file.

5. The method of claim 1, wherein strings identified in the file are executed in a sandbox and the polyglotness score is based on a presence of an executable string from the strings identified in the file.

6. The method of claim 1, wherein the polyglotness score is based on a presence of a temporal file within the file.

7. At least one non-transitory machine-readable medium comprising one or more instructions that when executed by at least one processor, cause the at least one processor to: identify a file; determine a likelihood that the file is a polyglot file, wherein the determination includes analyzing the file using at least two of: a format specification analysis of the file, a data structure decomposition of the file, a program language estimation to determine a program language that was used to write at least part of the file, and a sandboxed test of at least a portion of the file; determine a polyglotness score for the file, wherein the polyglotness score is an indicator of whether or not the file is a polyglot file; and analyze the file for a presence of ma ware when the polyglotness score satisfies a threshold.

8. The at least one non-transitory machine-readable medium of claim 7, wherein the polyglotness score is based on a presence of anomalies to data structures of the file.

9. The at least one non-transitory machine-readable medium of claim 8, wherein the data structures of the file are determined from a file specification associated with the file.

10. The at least one non-transitory machine-readable medium of claim 8, further comprising one or more instructions that when executed by the at least one processor, further cause the processor to:

analyze markers and structures of the file that match a known file type defined by a file specification to determine the presence of anomalies to data structures of the file.

11. The at least one non-transitory machine-readable medium of claim 7, wherein strings identified in the file are executed in a sandbox and the polyglotness score is based on a presence of an executable string from the strings identified in the file.

12. The at least one non-transitory machine-readable medium of claim 7, wherein the polyglotness score is based on a presence of a temporal file within the file.

13. An apparatus comprising: at least one processor; memory; and a security engine configured to cause the at least one processor to: identify a file; determine a likelihood that the file is a polyglot file, wherein the determination includes analyzing the file using at least two of: a format specification analysis of the file, a data structure decomposition of the file, a program language estimation to determine a program language that was used to write at least part of the file, and a sandboxed test of at least a portion of the file; determine a polyglotness score for the file, wherein the polyglotness score corresponds to the likelihood that the file is a polyglot file; and analyze Me file for a presence of malware when the polyglotness score satisfies threshold.

14. The apparatus of claim 13, wherein the polyglotness score is based on a presence of anomalies to data structures of the file.

15. The apparatus of claim 14, wherein the security engine is further configured to cause the at least one processor to: analyze markers and structures of the file that match a known file type defined by a file specification to determine the presence of anomalies to data structures of the file.

16. The apparatus of claim 13, wherein the polyglotness score is based on a presence of an executable string in the file, wherein strings identified in the file are executed in a sandbox to determine the presence of the executable string in the file.

17. The method of claim 1, wherein the format specification analysis includes a data structure analysis of the file and matching identified data structures to known file specifications.

18. The method of claim 1, wherein the data structure decomposition of the file includes identifying elements of the file based on known file specification elements including at least one of a start of file marker, an end of file marker, a global and local color palette, a cross-reference table, and quantization and Huffman tables.

19. The method of claim 1, wherein the file is searched for an end-of-file (EoF) marker and if the EoF marker is found more than once, an extraction process is triggered.

20. The method of claim 19, wherein the extraction process creates a new temporal file that includes an excerpt of content in the file that was between a first occurrence of an EoF marker and the next occurrence of a start-of-file (SoF) marker or a next EoF marker.

* * * * *

UNITED STATES PATENT AND TRADEMARK OFFICE
CERTIFICATE OF CORRECTION

| | |
|---|---|
| PATENT NO. | : 11,386,205 B2 |
| APPLICATION NO. | : 16/246751 |
| DATED | : July 12, 2022 |
| INVENTOR(S) | : German Lancioni et al. |

It is certified that error appears in the above-identified patent and that said Letters Patent is hereby corrected as shown below:

In the Claims

In Column 18, Claim 1, Line 25, delete "mal are" and insert -- malware --, therefor.

In Column 18, Claim 7, Line 56, delete "ma ware" and insert -- malware --, therefor.

In Column 19, Claim 13, Line 23, delete "Me" and insert -- the --, therefor.

Signed and Sealed this
Eighteenth Day of October, 2022

*Katherine Kelly Vidal*

Katherine Kelly Vidal
*Director of the United States Patent and Trademark Office*